(12) United States Patent
Chang et al.

(10) Patent No.: US 9,059,466 B2
(45) Date of Patent: Jun. 16, 2015

(54) DIRECT SYNTHESIS OF LITHIUM ION BATTERY ELECTRODE MATERIALS USING GRAPHENE TREATED RAW MATERIALS AS THE REACTANT

(76) Inventors: Chun-Chieh Chang, Ithaca, NY (US); Tsun-Yu Chang, Taichung (TW)

(\*) Notice: Subject to any disclaimer, the term of this patent is extended or adjusted under 35 U.S.C. 154(b) by 482 days.

(21) Appl. No.: 13/453,005

(22) Filed: Apr. 23, 2012

(65) Prior Publication Data

US 2013/0248773 A1  Sep. 26, 2013

Related U.S. Application Data

(63) Continuation-in-part of application No. 13/427,044, filed on Mar. 22, 2012.

(51) Int. Cl.
| | |
|---|---|
| H01M 4/88 | (2006.01) |
| H01M 4/58 | (2010.01) |
| H01M 4/62 | (2006.01) |
| H01M 10/0525 | (2010.01) |
| H01M 4/02 | (2006.01) |

(52) U.S. Cl.
CPC ............ *H01M 4/5825* (2013.01); *H01M 4/625* (2013.01); *H01M 10/0525* (2013.01); *H01M 2004/021* (2013.01); *Y02T 10/7011* (2013.01)

(58) Field of Classification Search
CPC .... B82Y 30/00; H01M 4/362; H01M 4/5825; H01M 4/625
USPC ...................... 252/182.1, 506; 429/211, 231.9
See application file for complete search history.

(56) References Cited

U.S. PATENT DOCUMENTS

| | | |
|---|---|---|
| 6,514,640 B1 | 2/2003 | Armand et al. |
| 6,702,961 B2 | 3/2004 | Barker et al. |
| 6,723,470 B2 | 4/2004 | Barker et al. |
| 6,815,122 B2 | 11/2004 | Barker et al. |
| 6,855,273 B2 | 2/2005 | Ravet et al. |
| 6,884,544 B2 | 4/2005 | Barker et al. |
| 6,913,855 B2 | 7/2005 | Stoker et al. |
| 6,962,666 B2 | 11/2005 | Ravet et al. |
| 7,344,659 B2 | 3/2008 | Ravet et al. |
| 7,457,018 B2 | 11/2008 | Armand et al. |
| 7,494,744 B2 | 2/2009 | Chang |
| 7,585,593 B2 | 9/2009 | Chang |
| 7,629,084 B2 | 12/2009 | Chang |
| 7,718,320 B2 | 5/2010 | Chang |
| 7,988,941 B2 | 8/2011 | Choi et al. |

(Continued)

FOREIGN PATENT DOCUMENTS

| | | |
|---|---|---|
| WO | 2007064934 A2 | 6/2007 |
| WO | 2007064934 A3 | 5/2008 |

OTHER PUBLICATIONS

Becerril et al., Evaluation of Solution-Processed Reduced Graphene Oxide Films as Transparent Conductors, ACSNANO, Feb. 2008, 463-470, vol. 2, No. 3, ACSNANO.

(Continued)

*Primary Examiner* — Khanh Tuan Nguyen
(74) *Attorney, Agent, or Firm* — Thomas | Horstemeyer, LLP

(57) ABSTRACT

In one embodiment, a composition for use in making active materials for a lithium ion battery, the composition comprising a processed, homogenous mix of graphene-treated reactant, conductive material, and a Li and phosphate-based salt, the composition comprising a surface area of less than approximately 10 $m^2/g$.

15 Claims, 11 Drawing Sheets

(56) References Cited

U.S. PATENT DOCUMENTS

| | | | |
|---|---|---|---|
| 8,691,441 B2 * | 4/2014 | Zhamu et al. | 429/231.8 |
| 2005/0244321 A1 | 11/2005 | Armand et al. | |
| 2007/0031732 A1 | 2/2007 | Chiang et al. | |
| 2010/0047154 A1 | 2/2010 | Lee et al. | |
| 2010/0081057 A1 | 4/2010 | Liu et al. | |
| 2010/0247801 A1 | 9/2010 | Zenasni | |
| 2010/0266964 A1 | 10/2010 | Gilje | |
| 2011/0111299 A1 | 5/2011 | Liu et al. | |
| 2011/0114499 A1 | 5/2011 | Hori et al. | |
| 2011/0114919 A1 | 5/2011 | Jenkins et al. | |
| 2011/0143034 A1 | 6/2011 | Ahn et al. | |
| 2011/0186786 A1 | 8/2011 | Scheffer et al. | |
| 2011/0189406 A1 | 8/2011 | Cho et al. | |
| 2011/0189452 A1 | 8/2011 | Lettow et al. | |
| 2011/0210293 A1 | 9/2011 | Liang et al. | |
| 2011/0240947 A1 | 10/2011 | Yang et al. | |
| 2011/0268647 A1 | 11/2011 | Ivanovici et al. | |

OTHER PUBLICATIONS

Chen et al., Mechanically Strong, Electrically Conductive, and Biocompatible Graphene Paper, Advanced Materials, Jul. 2008, 3557-3561, vol. 20, Wiley InterScience.

Dikin et al., Preparation and characterization of graphene oxide paper, Nature, Jul. 26, 2007, 457-460, vol. 448, Nature Publishing Group.

Edman et al., Electrical resistivity of single-crystal graphite under pressure: An anisotropic three-dimensional semimetal, Mar. 15, 1998, 6227-6230, vol. 57, No. 11, The American Physical Society.

Si et al., Synthesis of Water Soluble Graphene, Nano Letter, Apr. 30, 2008, 1679-1682, vol. 8, Dept. of Chemistry, University of North Carolina at Chapel Hill, Chapel Hill, North Carolina U.S.

U.S. Appl. No. 13/427,044, filed Mar. 22, 2012 entitled "Direct Deposition of Graphene on Substrate Material" (Copy not provided as it is part of USPTO records).

* cited by examiner

200A

US 9,059,466 B2

DIRECT SYNTHESIS OF LITHIUM ION BATTERY ELECTRODE MATERIALS USING GRAPHENE TREATED RAW MATERIALS AS THE REACTANT

CROSS-REFERENCE TO RELATED APPLICATION

This application is a continuation-in-part of copending U.S. utility application entitled, "Direct Deposition of Graphene on Substrate Material," having Ser. No. 13/427,044, filed on Mar. 22, 2012, which is entirely incorporated herein by reference.

TECHNICAL FIELD

The present disclosure is generally related to electrode materials for Li ion-based rechargeable storage devices.

BACKGROUND

A crystal structure of graphite is shown in FIG. 1. The structure can be properly described using the space group of $P6_3/mmc$, and its layer-structured characteristic evidenced from the depiction in FIG. 1 and conventionally known. Graphite is constructed through honeycomb-structured, carbon layers held by Van der Waals forces. Since Van der Waals forces comprise one of the weakest chemical bonding in materials, the graphite layers may be theoretically exfoliated from the graphite surface as "graphene" layers without much sacrifice or consumption of energy and work. Nonetheless, graphite has been reported as a good electrical conducting material especially in the in-plane direction (e.g., the ab plane shown in FIGS. 1, 55 to 65 $\mu\Omega$ cm in resistivity) owing to the overlapping of the P orbital ($\pi$ bonding) of carbon atoms. Such features make graphene a desirable top-layer for substrate material surfaces if the electrical conductivity is important for material performance for certain applications.

In view of materials for lithium ion battery applications, electrical conductivity and lithium ion mobility largely determine the performance (e.g., rate capability or C-rate) of the material. Conventionally, carbon black (e.g. acetylene black) is used for the enhancement of electrical conductivity of the electrode containing battery active materials through mechanisms, such as addition, in the step of slurry formation during electrode processing. However, such addition mechanisms possess limited enhancement of electrode conductivity for one or a plurality of reasons. For instance, one reason may be the lack of contact between the material and the carbon black owing to the presence of binder. Another reason may be that the carbon black cannot penetrate to any place of the material, especially when material particles are small or mesoporous. Further, the high surface area nature of the carbon black makes the slurry formation procedure difficult during electrode processing.

Various conventional techniques include the incorporation of graphene with metal oxides in solution with the presence of surfactant. Indeed, this approach is somewhat similar to the techniques described above except the carbon source has been changed from carbon black to graphene. One problem with these conventional processes is that high surface area graphene layers do not adequately bond to the substrate material (e.g., metal oxide) in the solution. As a result, the adherence of graphene to the substrate material is questionable, and "free graphene" may not form proper bonding to the substrate material in the later stage (e.g. after drying or with subsequent heat treatment) or can be even present in the final product. Furthermore, the graphene in the solution may curve in the end (during drying or even in the solution) and form nanotubes that cannot form proper bonding to the substrate materials. Overall, the outcome is about the same, which is a drastic increase in the surface area of the as-synthesized material. Moreover, the performance of the as-synthesized material is strongly dependent on the weight percentage of "graphene" being present in the material.

SUMMARY

In one embodiment, a composition for use in making active cathode materials for lithium ion battery applications, the composition comprising a processed, homogeneous mix of (a) graphene-treated reactant, (b) conductive material, and (c) a Li and phosphate-based salt, and the resultant active material containing graphene exhibiting a surface area of less than 10 $m^2/g$.

In one embodiment, slurries for electrode coatings for a lithium ion battery are disclosed, the slurries comprising a composition comprising a mixture of the active material and second auxiliary conductive material in a slurry process state exhibiting a surface area of less than 10 $m^2/g$.

Other compositions, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
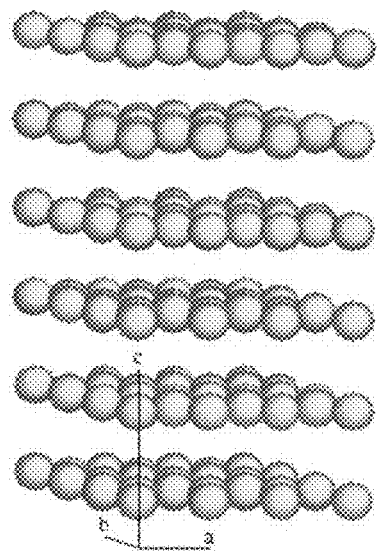
FIG. 1 is a schematic diagram depicting an example graphite crystalline structure.

Certain embodiments of an invention involving a method for producing electrode materials, and compositions resulting from the method embodiments, for lithium ion battery applications are disclosed, the methods referred to collectively as electrode material synthesis (EMS) methods. In EMS methods, primary particles of a reactant are enhanced in electrical conductivity using graphene, and secondary particles of the electrode material formed after subjecting (e.g., via mechanical mechanisms, such as friction-based techniques) the primary particles to a graphene coating are more electrically conductive owing to the presence of graphene on the primary particles. For instance, in one embodiment, one or more reactants are first deposited with graphene, the graphene coated reactants being used for subsequent reactions. Throughout the reactions, although the final product materials can be more or less sintered, the primary particles (e.g., the base or skeletal particles) are still covered with graphene, which maintains high electrical conductivity behavior of the post-reacted secondary particles. In other words, the electrochemical property (performance) of the synthesized material is less affected by the physical property of the material, such as particle size and surface area. As a result, the materials as synthesized maintain a high electrical conductivity while exhibiting a low surface area, which is very desirable for subsequent electrode processing (e.g. lower binder content needed, i.e., higher active materials content) and even the enhancement of electrode durability (e.g. enhanced cycle life, owing to better adherence to the substrate such as aluminum foil). Nonetheless, owing to the presence of graphene, rather than amorphous carbon coating, the viability of the storage of material over time can be prolonged. The chance of side reactions (e.g., gassing of the battery or high self-discharge rate over time) can be minimized, thus increasing the viability of the synthesized material being utilized for heavy duty applications such as electric vehicles and so on that require long battery cycle life and/or service life.

Herein, the terms reactants and substrate materials are used interchangeably, and generally refer to the electrode material before mechanical processes involving the coating of graphene on the reactant. Although described herein using a cathode material comprising $LiFePO_4$ for illustrative purposes, it should be appreciated by one having ordinary skill in the art that such reactants are not intended to be limiting, and that other reactants (for cathode or anode) may be used, including those comprised of Sulfur, $Li_2S$, $LiNiO_2$, $LiCoO_2$, $LiMn_2O_4$, stoichiometric or non-stoichiometric form, pure or with dopants, single or mixed oxides, etc., among others electrode compositions known for use with lithium ion battery applications. Such options for reactants are known in the industry. For instance, certain embodiments of EMS methods may be generally applicable in synthesizing electrode materials consisting of nano primary particles for Li-ion battery applications. In some embodiments, EMS methods may use lithium iron phosphate ($LiFePO_4$) and its derivatives (e.g. replacement of Fe with dopants or transition metal elements, such as disclosed in U.S. Pat. Nos. 6,514,640 and 6,702,961, and U.S. Patent Publication 2005/0244321, and U.S. Pat. Nos. 6,723,470, and 6,815,122, and 6,884,544, and 6,913,855, all incorporated herein by reference in their entirety). Some embodiments of EMS methods may use other, non-stoichiometric forms of the materials, such as Lithium iron phosphorous oxide, among other materials known and disclosed in U.S. Pat. Nos. 7,494,744, 7,585,593, 7,629,084, 7,718,320, all incorporated by reference in their entirety. Note that to the extent there is ambiguity in, or conflict between, the meaning or use of terminology used in the present disclosure and the same or similar terms used in the incorporated references, the present disclosure controls.

In addition, it should be appreciated within the context of the present disclosure that, in some EMS method embodiments, coating may result in multiple, non-overlapping graphene layers produced on a given reactant surface, or in some embodiments, multiple overlapping layers may be produced on a given reactant surface. In some embodiments, there may be multiple single layers produced that are capable of being peeled off from the source (e.g., a hollow cylinder, member, etc.). In general, coating may be accomplished according to one or more graphene processing methods disclosed in co-pending and commonly assigned U.S. patent application, entitled, "Direct Deposition of Graphene on Substrate Material," having Ser. No. 13/427,044, filed on Mar. 22, 2012, and incorporated herein by reference in its entirety. In that application, as is applicable here, coating may involve placing the reactant in a container that includes graphite where the container is rotated, shaken, or otherwise placed in motion to enable frictional contact between the reactant (e.g., ground reactant, such as accomplished via a grinding mill or other known methods of reducing particulate size) and the graphite material, resulting in the reactant bonding with the coating of (a) graphene layer(s). Reference herein to "coating" or the like includes, in one embodiment, the formation of a contiguous, graphene monolayer on one or more external surfaces of a material substrate (reactant). In some embodiments, reference to "coating" or the like includes the formation of a discontiguous, graphene layer(s) on one or more external surfaces of a material substrate, or stated otherwise, the formation of a graphene layer(s) in a select portion of a given external surface or multiple graphene monolayers in respective selected portions of a given external surface of the substrate materials, hence resulting in one or more gaps, for instance, in one of the external surfaces of the substrate material where a graphene layer(s) is not present in the gap(s).

In addition, surface area as used herein includes a specific surface area for slurry process state material and its preceding active material (e.g., referred to also herein as final product (e.g., $LiFePO_4$-graphene composites or $LiFePO_4$ derivatives-graphene composites, such that other metal oxides may be used in place of iron (Fe)). In one or more embodiments, the active material may include a processed (e.g., heat treated (including heated and dried), crushed, and/or grinded) homogenous mix of graphene treated metal oxide, conductive material, and a Li-based salt (e.g., phosphate based). The active material may be used for making slurries (the slurry process material or also, slurry process state material) for electrode coatings. In the slurry process state material, carbon black (or other conductive material) is included with the active material.

Having summarized certain features and/or benefits of one or more embodiments of EMS methods and/or compositions of the present disclosure, reference will now be made in detail to the description of the disclosure as illustrated in the drawings. While the disclosure will be described in connection with these drawings, there is no intent to limit it to the embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Figure 2A:
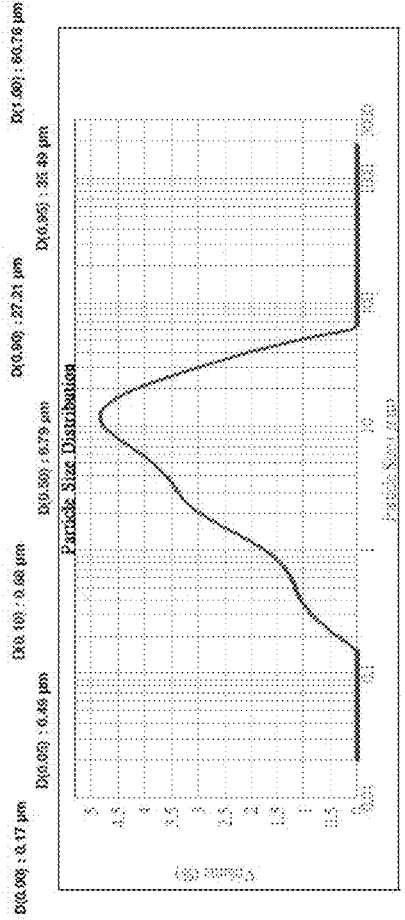
FIGS. 2A and 2B are plot diagrams depicting particle size distribution of iron oxide before and after ball milling, respectively, over a twenty-four (24) hour period of time.
Figure 2B:
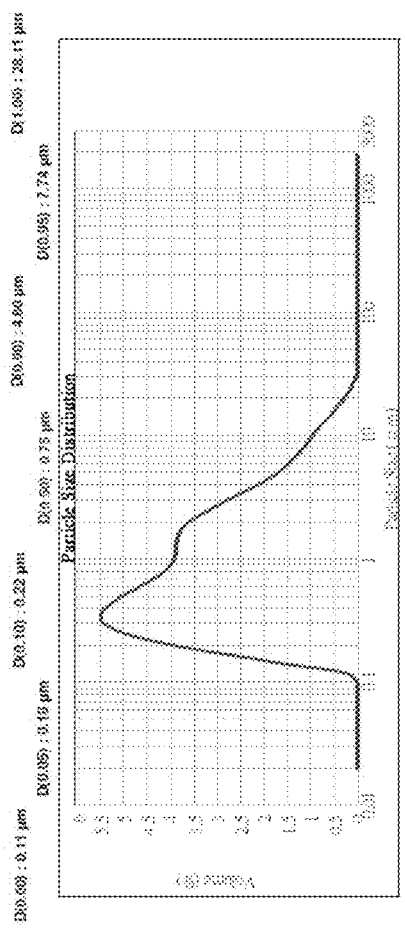

In the disclosure that follows, certain EMS method and composition embodiments are disclosed in the context of plural (e.g., three) examples that illustrate the application and utility of one or more EMS methods in producing electrodes for lithium ion batteries. In the present example, Example 1, iron oxide ($Fe_2O_3$) is used as the starting material (reactant). The iron oxide is subjected to a grinding operation for a defined period of time. In Example 1, the grinding operation comprises ball milling, though other mechanisms well-known in the art for grinding the reactant to reduce particulate size are contemplated to be within the scope of the EMS method embodiments. In Example 1, the ball milling of the reactant occurs for 24 hours. FIG. 2A and FIG. 2B are plot diagrams 200A and 200B, respectively, with a "y" axis corresponding to volume percentage (%) of the reactant particle and the "x" axis corresponding to the particle size (in micrometers, or μm). In particular, FIGS. 2A and 2B show the particle size distribution of iron oxide before and after being ball milled. From FIG. 2B, it is apparent that the ball milled iron oxides are mainly nano particles.

The as-milled iron oxide (ground reactant) is then subjected to graphene coating using any one of a plurality of different mechanical friction techniques disclosed in the co-pending application referenced in the beginning of the present disclosure. In Example 1, a planetary mixer is used, and the planetary mixer acts on the ground reactant for a defined period of time (e.g., 24 hours). Table I, reproduced below, shows the particle size and specific surface area of the iron oxide before and after the graphene treatment.

TABLE I

| Sample No. | Operation | Particle Size Analysis (μm) | | | | | Surface Area BET ($m^2/g$) |
|---|---|---|---|---|---|---|---|
| | | D0 | D10 | D50 | D90 | D100 | |
| AE35010 | Raw Material | 0.17 | 0.88 | 6.79 | 27.21 | 60.78 | 3.5326 |
| AE35111 | 24 Hr. Ball Milling | 0.11 | 0.22 | 0.75 | 4.6 | 28.11 | 5.0918 |
| AE35121 | 24 Hr. Graphene Treatment | 0.14 | 0.27 | 0.75 | 4.31 | 27.91 | 4.9186 |

From Table I it can be seen that there is almost no change in particle size and surface area for samples before and after the graphene treatment. That is, it can be seen that both the particle size and BET have not changed much during the coating process. Since the only difference is the graphene treatment, it is apparent that the enhancement of materials capacity (as will be shown in the following description) is caused by the deposition of graphene on the reactant material. One feature that is noteworthy is that the BET has not increased much during the graphene deposition process, so it is reasonable to conclude that the graphene has been bonded to the material surface (explained further in the description associated with Example III below). If this is not the case, the surface area should have increased significantly (even if a small portion of graphene is present in the material) considering the theoretical surface area of graphene is 2630 $m^2/g$.

Continuing with an explanation of an embodiment of an EMS method and associated composition in the context of Example 1, a Li-based salt suspension is prepared for mixing. In one embodiment, the Li-based salt suspension may be a $LiH_2PO_4$ suspension, though other Li-based salt suspensions (including a phosphate or derivative thereof as part of the solution) may be used. In Example 1, the $LiH_2PO_4$ is prepared by adding stoichiometric amount of lithium carbonate ($Li_2CO_3$) into a phosphoric acid ($H_3PO_4$) water solution. Afterwards, the $LiH_2PO_4$ suspension is added to the graphene treated iron oxide powders. In the present example, an equimolar of carbon black (e.g., Super P, though other conductive material may be used in some embodiments or none at all in some embodiments, and in some embodiments, less than or greater than equimolar amounts may be used) to iron oxide was added to the graphene treated iron oxide for either ensuring later on inter-secondary-particle conductivity or being involved in the reaction for facilitating oxygen removal. Such addition of carbon black may occur at one of a plurality of different stages of the process (e.g., also in the slurry process stage). Note that using carbon black alone does not enhance the electrical conductivity of the final product material efficiently, since it has been observed that carbon black can not cover surfaces of all primary particles. Nonetheless, even if all surfaces of the iron oxide are covered with carbon black, the resultant material may comprise too much excess carbon (which may decrease the capacity of the resultant materials).

The above mentioned $LiH_2PO_4$ suspension/graphene treated iron oxide (grounded) mixture, which includes a defined quantity of conductive material, should contain less than 30 wt % of water content in weight in some embodiments, at or approximately at 20 wt % of water in some embodiments, and at or approximately at 18 wt % in some embodiments. For instance, at these reduced weight percentages, there is a lower possibility of graphene peel off from the iron oxide surface during mixing. The mixing enables further post-processing to achieve electrode material of low surface area and high conductivity.

After mixing, the mixture (which may be a non-flowing slurry, a paste, or powder depending on the water content) is subject to further processing to achieve a final product or active material. Such processing may include heating, crushing, or grinding, or one or more combinations of the same or a subset thereof. For instance, in one embodiment, processing may include heating and crushing. In some embodiments, processing may include heating, crushing, and grinding. Note that no particular order is implied by the aforementioned listing of sub-processes (e.g., such sub-processes may occur in different orders). In some embodiments, one or more of such sub-processes may be implemented more than once. For instance, in one embodiment, processing may include two heat treatments, and a single crushing. Further, it is noted that heating includes drying in some embodiments. In the present example (Example 1), the mixture is dried at, for instance, 150° C. overnight and then followed by crushing using a regular blender or devices with similar function. The crushed material is heat treated under controlled atmospheric environment to 575° C. for 8 hours in this example, though not limited to these temperature values or durations under heat. The electrochemical performance and the physical property of the resultant powders (e.g., active material, or final product) are shown in Table II below:

TABLE II

| Sample No. | Battery Test Results (mAh/g) | | | | | |
|---|---|---|---|---|---|---|
| | $1^{st}$ CC | $1^{st}$ DC | $3^{rd}$ CC | $3^{rd}$ DC | 16nd CC | 16nd DC |
| AE35032 | 156.066 | 138.003 | 102.491 | 102.903 | 97.7619 | 97.4251 |

| Sample No. | Particle Size Analysis Results (μm) | | | | | Surface Area BET ($m^2/g$) |
|---|---|---|---|---|---|---|
| | D0 | D10 | D50 | D90 | D100 | |
| AE35032 | 0.31 | 0.9 | 5.94 | 28.92 | 70.44 | 3.0904 |

The battery test results shown in Table II were materials being tested under C/10 in the $1^{st}$ cycle (shown as $1^{st}$ CC, $1^{st}$ DC for 1$^{st}$ charge and discharge capacity), and ~2C in the rest of the cycles (only 3$^{rd}$ and 16$^{th}$ cycles capacity data shown). As noted above, the surface area of the final product is less than 10 m$^2$/g, and in this example, approximately 3 m$^2$/g (e.g., 3.0904 m$^2$/g). A lower final product surface area implies less binder is needed for substrate material adherence. Further, a lower final product surface area means less conductive material (e.g., carbon black in this example) is needed in the slurry making process described below. For instance, even if more carbon black is added, there is no further help in increasing the electrode conductivity, which is one motivation for enhancing the primary particle electrical conductivity using graphene during material synthesis. Stated otherwise, when primary particle electrical conductivity is enhanced, even though the final product surface area is low, good battery performance is realized. Nonetheless, even more advantages may be obtainable when the surface area is low, including low binder, low additional carbon black needed for the slurry, etc.

Having described one example, Example 1, attention is now directed to another example illustrating certain embodiments of EMS methods and associated compositions, referred to herein as Example 2. In the present example, iron oxide ($Fe_2O_3$) is again used as the starting material (reactant). The iron oxide is first subjected to grinding (e.g., ball milling) for 24 hours. The as-milled iron oxide (grounded reactant) is then subjected to graphene coating using a mechanical friction technique (e.g., the planetary mixer) for 24 hours. Another Li-based salt suspension is used, this time $LiNH_4HPO_4$, which comprises a suspension that is prepared by adding pre-mixed lithium carbonate ($Li_2CO_3$) ammonium bicarbonate ($NH_4HCO_3$) powders with a molar ratio of 1:2 into the phosphoric acid ($H_3PO_4$) water solutions. The water can be replaced by 1% of CMC (carboxymethyl cellulose) solution for better suspension solution. It should be appreciated within the context of the present disclosure that other Li-based salt solutions may be used in some implementations, and that the composition used in this example is merely for illustrative purposes.

The $LiNH_4HPO_4$ suspension is added to the graphene treated iron oxide powders. In the present example, again equimolar of carbon black (Super P) to iron oxide was added to the graphene treated iron oxide for ensuring later on inter-secondary-particle conductivity, though not limited to equimolar as discussed above. The above-mentioned $LiNH_4HPO_4$ suspension/graphene treated iron oxide mixture (e.g., with conductive material) should contain less than 30 wt % of water content in weight in some embodiments, at or approximately at 20 wt % in some embodiments, or at or approximately at 18 wt % in some embodiments. One reason for these percentages, as noted above, is to decrease the possibility of graphene peel off from the iron oxide surface during mixing.

After mixing, further processing ensues. For instance, in Example 2, the mixture is dried at 300° C. for 5 hours, as one example of post-mixing processing. The as-prepared sample is then crushed and grinded (e.g., ball milled) again for 24 hours followed by another 24 hours of graphene treatment. The crushed and grinded sample is subjected to one more heat treatments to 550° C. for 5 hours. Phase pure materials are obtained (characterized by x-ray diffraction or XRD) after the second heat treatment. The electrochemical performance and the physical property of the resultant powders (active material or final product) are shown in Table III, reproduced below, where the final product has a low surface area (e.g., less than 10 m$^2$/g, or in this example, 6.6984 m$^2$/g) and excellent electrochemical properties (e.g., capacity or charge/discharge performance). Similar to Example 1, the low surface area (e.g., less than 10 m$^2$/g) results in a benefit in that less binder or conductive material is needed in the subsequent slurry processing, among other benefits.

TABLE III

| Sample No. | Battery Test Results (mAh/g) | | | | | |
|---|---|---|---|---|---|---|
| | 1$^{st}$ CC | 1$^{st}$ DC | 3$^{rd}$ CC | 3$^{rd}$ DC | 16nd CC | 16nd DC |
| AE35068 | 157.93 | 144.985 | 114.197 | 111.845 | 100.513 | 99.4264 |

| Sample No. | Particle Size Analysis Results (μm) | | | | | Surface Area BET (m$^2$/g) |
|---|---|---|---|---|---|---|
| | D0 | D10 | D50 | D90 | D100 | |
| AE35068 | 0.31 | 1.86 | 5.74 | 12.8 | 21.23 | 6.6984 |

Figure 3A:
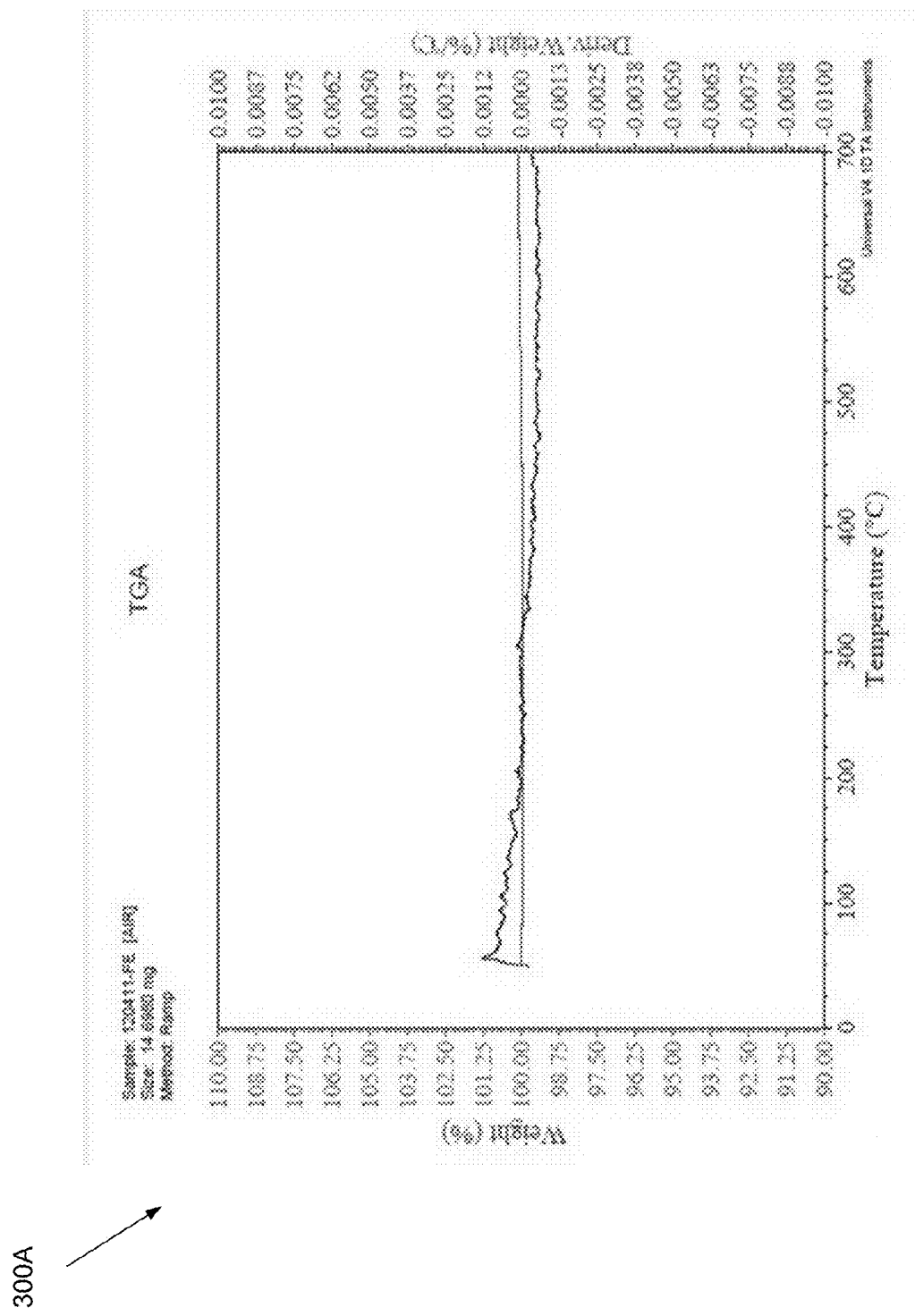
FIGS. 3A-3B are plot diagrams depicting thermal gravimetric analysis (TGA) analysis results of $Fe_2O_3$ and graphite samples, respectively.
Figure 3B:
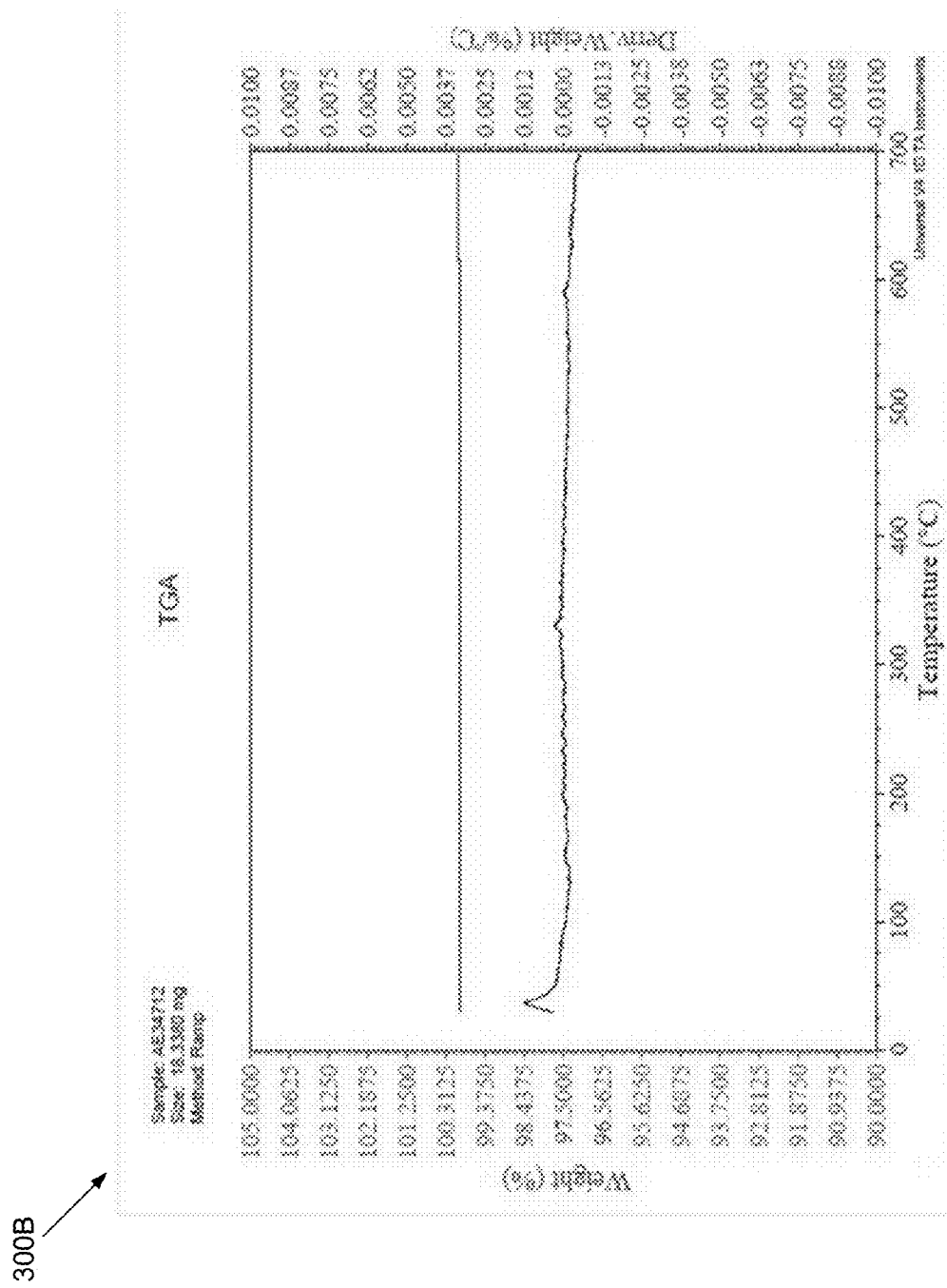

Having described two illustrative examples, a third example (Example 3) is provided below to illustrate the reactant bonding to the graphene based on the coating process. More particularly, Example 3 illustrates that graphene is successfully deposited on iron oxide reactant with chemical bonding, which leads to distinct physical and electrochemical properties of the active material and the subsequent slurry process state material. That is, Example 3 provides a more comprehensive illustration for the deposition of graphene on the iron (III) oxide powder in the coating and mixing processes described in Examples I and II. FIGS. 3A and 3B are plot diagrams 300A and 300B, respectively, which provide some thermal gravimetric analysis (TGA) results of $Fe_2O_3$ and graphite samples. In each plot 300A, 300B, the left-side "y" axis corresponds to weight percentage (%), the right-side "y" axis corresponds to derivative weight % (in %/Celsius or C temperature), and the "x" axis corresponds to temperature (C). The graphite sample was obtained by taking a piece of the graphite cylinder (used in the planetary mixer) that was ground into the powder form before the analysis. From FIGS. 3A and 3B, it is apparent that both materials are stable in air atmosphere up to 700° C.

Figure 4:
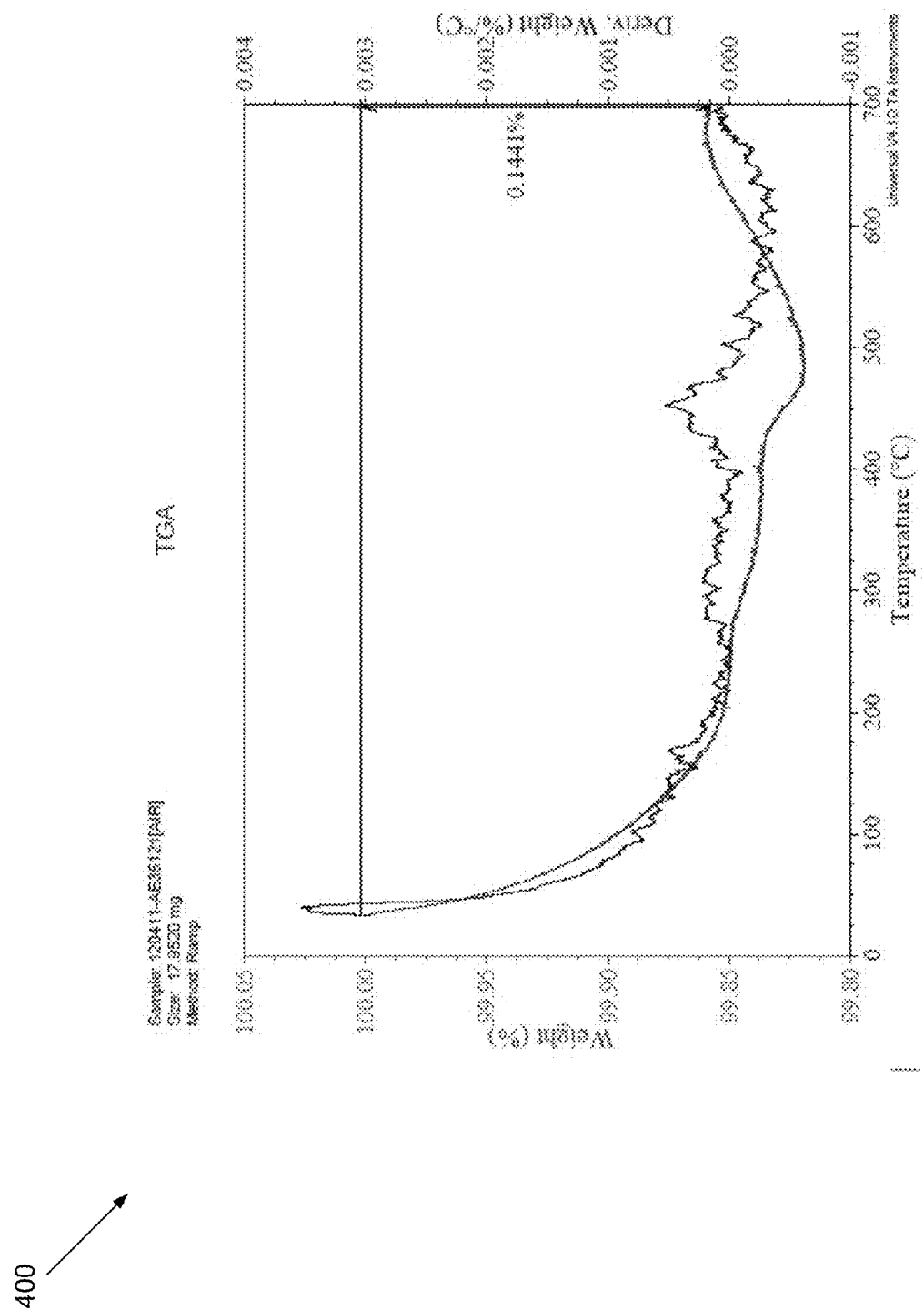
FIG. 4 is a plot diagram depicting TGA analysis of graphene-treated iron oxide.
Figure 5:
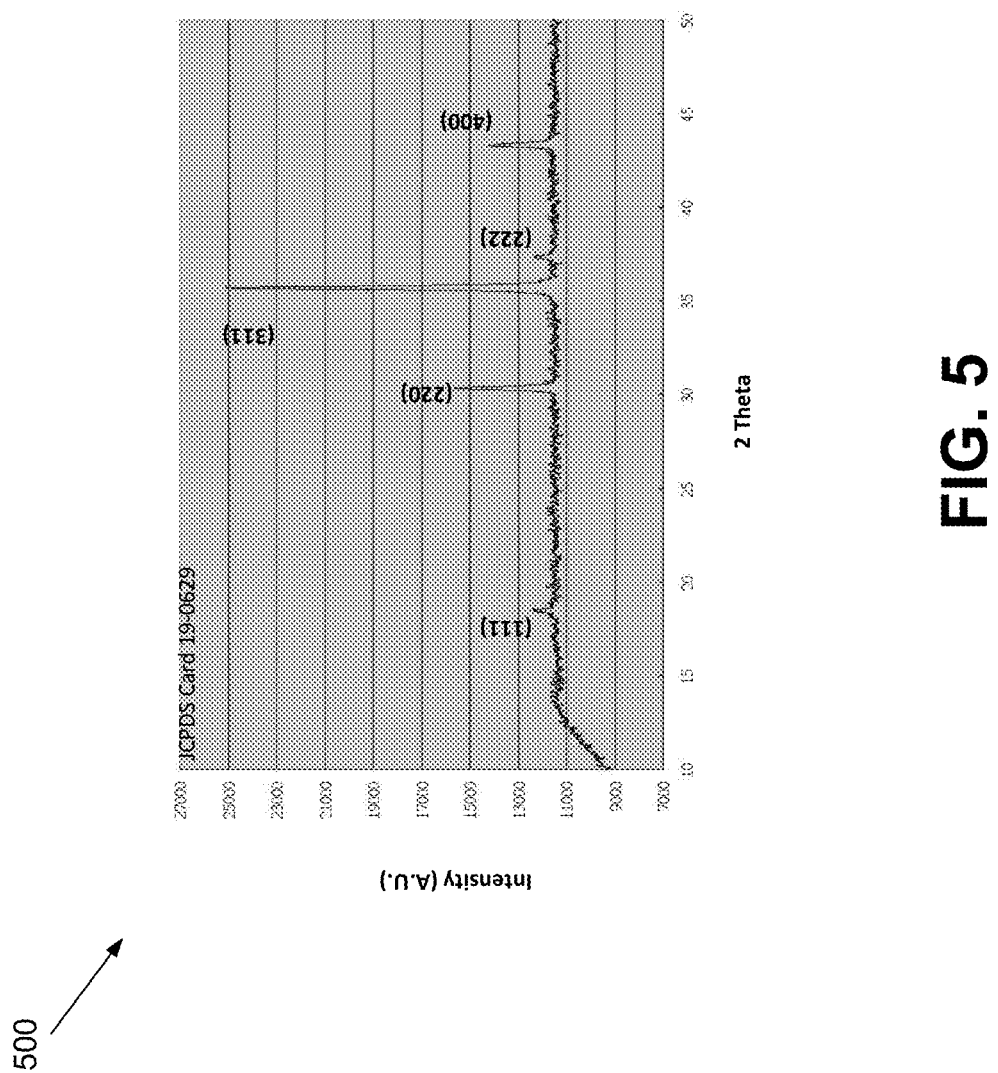
FIG. 5 is a plot diagram depicting x-ray diffraction (XRD) analysis of $Fe_3O_4$ formed from carbon and $Fe_2O_3$.

Referring to FIG. 4, shown is a plot diagram 400 of the TGA result of the graphene treated iron (III) oxide. A small fraction of weight loss was observed (99.825% at 500° C. compared to original 100%). Since iron oxide ($Fe_2O_3$) and carbon may react and form ($Fe_3O_4$) at elevated temperatures (as illustrated by the XRD data shown in the plot diagram 500 of FIG. 5), the weight loss observed in FIG. 4 may be represented by the chemical reaction below:

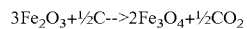

$3Fe_2O_3 + \frac{1}{2}C \rightarrow 2Fe_3O_4 + \frac{1}{2}CO_2$

The weight loss observed in FIG. 4 may thus be understood as a partial reaction of iron (III) oxide reacting with graphene. The weight change of the above reaction may be presented as follows:

22X/486*100%=0.175%, where X is thus obtained as 0.0387 (i.e., 3.87% of iron (III) oxide is reacted with graphene). In the present case, 3 kg of $Fe_2O_3$ is used for graphene treatment, and hence the weight of graphene reacted is as follows:

3000*0.0387/480*0.5*12=1.45125 g

If the surface area of the iron (III) oxide is 5.0918 m$^2$/g as shown in Table I and 2630 m$^2$/g for graphene, assuming both mixed together without bonding, the calculated surface area is as follows:

(3000*5.0918+2630*1.45125)/3001.45125=6.36 m$^2$/g

Since 4.9186 m$^2$/g is observed for the graphene treated iron (III) oxide, which is very close to 5.0918 m$^2$/g rather than 6.36 m²/g, it is evident that the graphene is indeed bonded to the iron (III) oxide rather than just existing as free standing graphene sheets; hence supporting that graphene is coated on top of the reactant and serves as a source of primary particles in the final product. Accordingly, Experiment 3 is designed to reveal the amount of graphene present in the coated iron oxide.

From Examples 1-3 above, several features of one or more embodiments of EMS methods are evident: (a) surface treatment with graphene is applied on the starting materials (reactant); (b) the lithium salt is prepared in the form of suspension that may be mixed with the graphene treated materials homogeneously; (c) water content of the lithium salt/graphene treated oxide powders is controlled with a focus toward making paste like materials or moisturized powders; (d) the number of subsequent heat treatments may be optimized, with a focus toward implementing graphene treatment before each of the following heat treatments; (e) the surface area of the resultant material may be very low (e.g. 3 m²/g) and still exhibit excellent electrochemical properties.

It is noted that a low surface area of the material may provide advantages of smaller amount of binder and/or auxiliary conductive material (e.g. carbon black) needed for making the electrode. In conventional PVDF/NMP (polymer/solvent) slurry, the binder content may be lower than 3 wt %; in conventional SBR/Water (polymer/solvent) slurry, the binder content may be as low as 1 wt % only or less. In one or more embodiments of EMS methods and associated compositions, the materials surface area that includes auxiliary conductive material ready for slurry processing may be less than 10 m²/g, which contrasts with conventional nano materials exhibiting high surface area (>20 m²/g), which requires a relatively large amount of carbon black (e.g. 10 wt % and thus resulting high surface area materials in the slurry processing state). Taking the slurry composition utilized in Example I and II for making the electrodes, the slurry process state material implies a combination of active materials and carbon black, which is 97 wt % of active material (3 m²/g in surface area)+3 wt % of carbon black (e.g. 60 m²/g in surface area) that results in a total of less than 10 m²/g. Taking Example I for further calculations, carbon black has a surface area of 60 m²/g, the total surface area of the material in the slurry process state can be calculated as: 3 wt % of carbon black+97 wt % of final product, which is equivalent to 60 m²/g*0.03+3.0904 m²/g*0.97=4.8 m²/g. Similarly, taking Example II for further calculations, the total surface area of the material in the slurry process state can be calculated as: 60 m²/g*0.03+6.6984 m²/g*0.97=8.3 m²/g. In conclusion, a low surface area (<10 m²/g) of the resultant material should result in a low surface area (<10 m²/g) of the slurry state materials which includes the active material and the auxiliary conductive material (e.g. carbon black in this case). Note that in one embodiment, reference to a "composition" includes a mixture of constituent elements.

Figure 6:
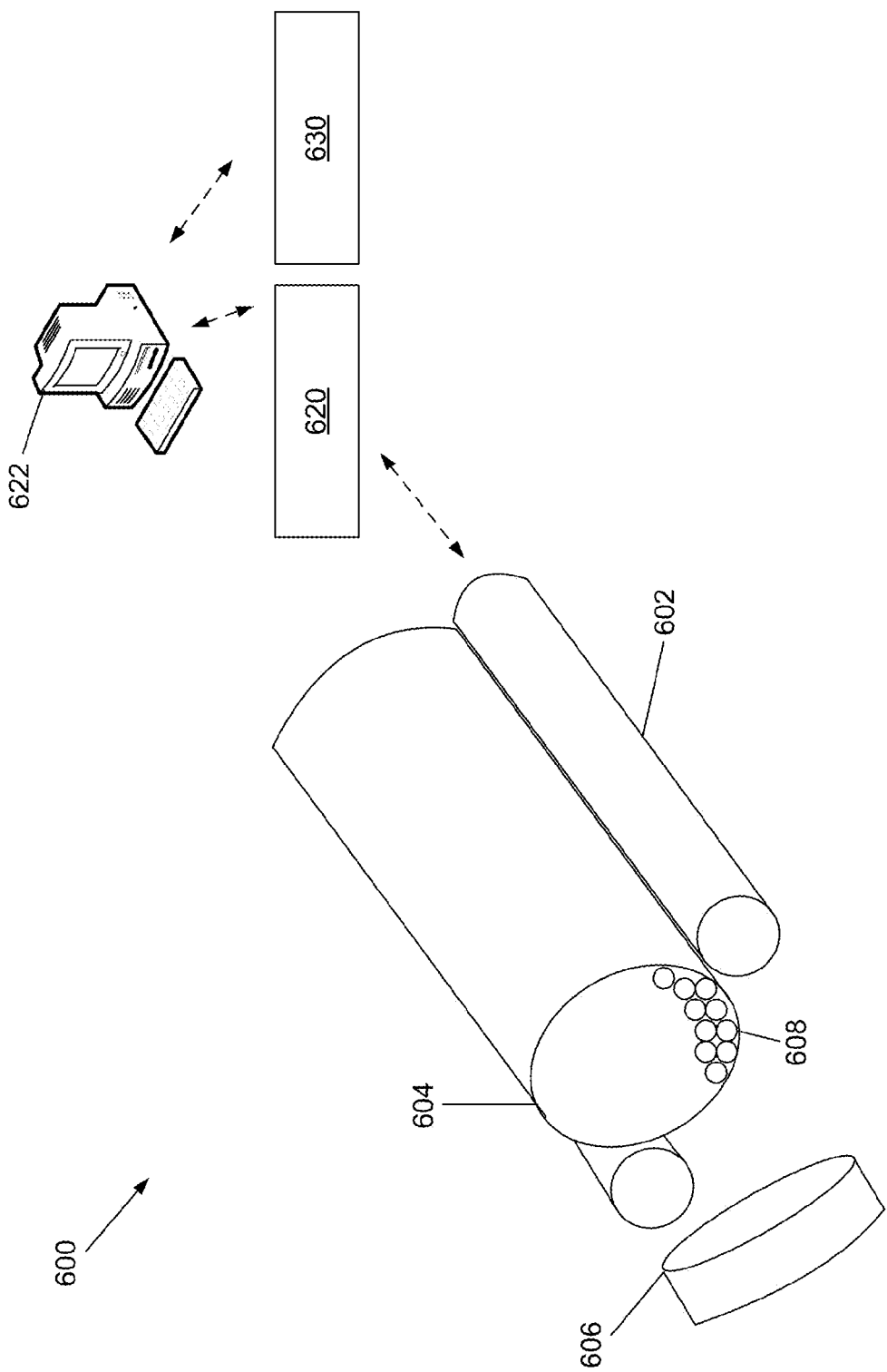
FIG. 6 is a block diagram depicting one embodiment of an example mechanical apparatus used for coating reactant with graphene.

FIG. 6 is a block diagram that depicts certain portions of an example system that may be used to coat reactant with graphene and perform post processing. One having ordinary skill in the art should appreciate in the context of the present disclosure that the example apparatus is merely for illustrative purposes, with other variations and/or mechanical apparatuses that enable frictional contact between the graphene and reactant are contemplated to be within the scope of the disclosure. As shown in FIG. 6, a system 600 comprises an apparatus with one or more shafts, such as shaft 602, that is coupled to a motor 620, the shaft 602 engaged (e.g., fixed or detachably connected or coupled) to a container 604 by known fastening mechanisms. The motor 620 may further be operatively coupled (e.g., wireless or wired) to a computing device, such as computer 622. The computer 622 may be used to control the motor 620 and hence motion (e.g., duration of the motion, speed or manner of agitation, etc.). Also included in the system 600 is a mixing apparatus 630, well known in the art. Such a mixing apparatus 630 may be integrated with, or coupled to, heating and/or drying functionality. The mixing apparatus 630 enables the mixing of graphene coated, grounded reactant with a Li-based salt suspension, and the mixing apparatus 630 may be under the control of the computer 622. In some embodiments, the system 600 may also include a slurry process machine, well known in the art, for mixing compositions, such as the auxiliary conductive material with the active material in making an electrode. In some embodiments, the slurry process machine may be located elsewhere.

In some embodiments, the mixing may occur in a separate system or facility, and in some embodiments, the mixing, heating, and drying functionality may be distributed among several devices. In some embodiments, control of the motor 620 may be integral to the motor. Note that the shaft and container and motor is also referred to herein as an assembly, and that in some embodiments, the assembly may comprise different sources of motion (e.g., a planetary mixer, tumbler, shaker, centrifuge, among others). In other words, any mechanism or apparatus known in the art to cause motion of the contents in the container 604 may be used, and hence any depiction or description of a particular apparatus is for illustrative, not limiting purposes. In some embodiments, the shaft 602 and container 604 may be an integral unit, or the container 604 may be removable, or the shaft 602 and container 604 may be part of a larger assembly. For instance, the container 604 may be embodied as a tube or chamber disposed in a platform of a planetary mixer or other mechanical device, the tube disposed in the platform among other tubes.

In the depicted embodiment, the container 604 is embodied as a hollow cylinder composed of graphite material, though other geometries are contemplated to be within the scope of the disclosure. In some embodiments, the graphite material may be disposed only on the inner surface of the container 604, where the outer surface is comprised of a different material (e.g., a plastic-based material, metal material, glass, etc.). Note that, as is true with all containers described herein, the container may be disposed within a chamber of a given motion-causing apparatus, or may be integral to the actual apparatus. Further, there is no intent to limit the container in size, such that a plurality of different-sized containers is contemplated to be within the scope of the disclosure. Further, movement caused by the motor(s) 620 (or other device(s) in some embodiments) may include rotational movement (e.g., along a single axis), tumbling movement (e.g., along multiple axes of rotation), and/or shaking movements, among others as should be understood by those having ordinary skill in the art.

The container 604 comprises a removable lid 606, which serves to fully enclose (at least temporarily) the container 604 and hence constrain movement of substrate material 608 (and member(s) where used, as explained below), deposited or otherwise disposed internally to the container 604, to the interior boundaries of the container during motion. The substrate material 608 includes one of a plurality of different types of substrate material, such as iron oxide used in the present disclosure, metals balls, graphite balls, graphite powders, ceramics, or a combination of two or more of these or other materials.

In operation, and referring still to FIG. 6, the motor 622 (e.g., under control of the computer 622) causes motion of the container 604, such as a tumbling motion. Responsive to this motion, the substrate material 608 is caused to come into frictional contact with the graphite particles of the inner surface of the hollow cylinder 604, resulting over time in the coating of the substrate material 608 with the graphite particles of the inner surface of the container 604 in the form of a single atomic layer or graphene (or multiple dispersed or overlapping graphene layers). Such operation may occur (as is also true in the embodiments that follow) under standard room temperatures and pressures and atmospheric conditions, without the introduction of solutions/solvents and/or post-processing activities (e.g., exfoliation, drying, etc.).

Note that the source of the graphene may be introduced in other ways, as disclosed further in the co-pending application cross-referenced in the beginning of the disclosure. For instance, the container 604 may be embodied as a hollow graphite cylinder, similar to that described in association with FIG. 6, or as a container of a different form (e.g., a jar) and/or material (e.g., glass, plastic etc.) where the source of the graphene is via in an internal graphite coating, or via one or more members loosely disposed in the container and configured as a solid graphite bar, balls, powder (e.g., used in conjunction with a film disposed in the container, such as transparent film (e.g., polyethylene terephthalate, PET, among others) or films made of other polymers (e.g. Polyethylene PE, polypropylene PP, Poly(1,4-butylene terephthalate PBT)) or even glass substrate or glass fibers and films), or hollow graphite cylinder (or other geometrical shape and/or density) within the container (or fixed to an internal surface of the container 604 in some embodiments). Responsive to motion (based on the motor 620 engaging the shaft 602 to cause the container 604 to tumble or otherwise move along one or more axes), the substrate material 608 comes into frictional contact with the graphite surfaces of the graphite member, resulting in a coated substrate material (e.g., coated with graphene or graphene layers).

Figure 7:
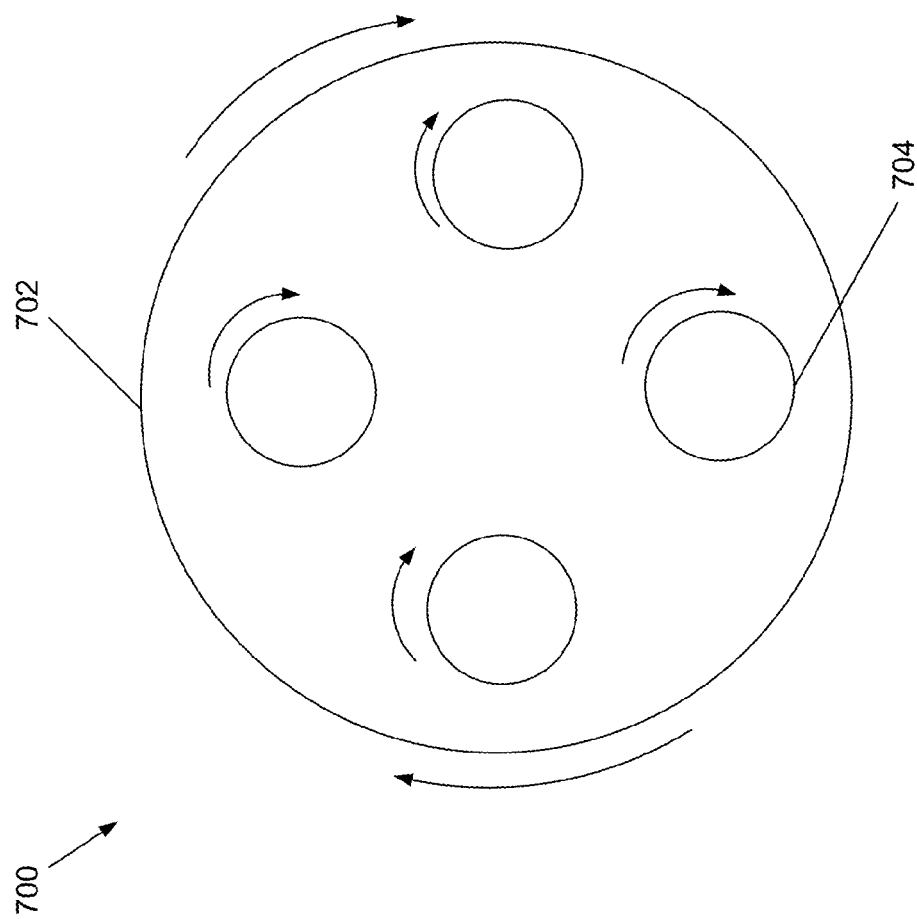
FIG. 7 is a block diagram of an example planetary mixer.

FIG. 7 illustrates select portions of an example planetary mixer 700, which is one example of many of a mechanical device or apparatus that may be used for the coating of graphene with reactant. In particular, the planetary mixer 700 comprising a platform or main rotating plate 702 that carries one or more (e.g. four in this example) sample chambers (e.g., tubes, such as steel (e.g., stainless steel)), such as sample chamber 704 (the sample chamber 704 comprising a container (e.g., container 604) disposed within the tubes), rotating independently of, or not synchronized with, the rotating speed of the main rotating plate 702. In some embodiments, the chamber itself may serve as the container 604. For instance, a very large mixer may be used, where the inner wall of the chamber may be covered with graphite strips or graphite tiles. In such an implementation, the mixer may be significantly larger (e.g., without the constraints of the size of a graphite cylinder).

As explained previously, the container size or environment where implemented is not limited to suitability with or integration with a planetary mixer, and hence may be disposed in or integral to any apparatus that causes motion to enable friction contact between substrate material and graphite material. The samples contained in the sample chambers 704 may be subjected to centrifugal forces created by the rotation of the main rotating plate 704, and the samples may move inside the sample chamber (e.g., mixing or otherwise coming into frictional contact with each other) when sample chambers 704 are rotating independently. As should be understood by one having ordinary skill in the art, the main rotating plate 702 may be oriented either vertically or horizontally. In the depicted example, the planetary mixer 700 is oriented vertically (e.g., the main rotating plate 702 is vertical).

It should be understood that the above described embodiments may be carried out using one or more apparatuses, such as part of the system 600 shown in FIG. 6, in accordance with an entirely automated process, or in some embodiments, utilized with some assistance from a human operator. Such processing, where automated, may be controlled at least in part manually or entirely (or in part) through execution by one or more processors executing instructions or code (e.g., executable code) under the auspices of an operating system (or without an operating system in some embodiments) embodied in one or more computers (e.g., computer 622) or other electronic devices (e.g., programmable logic controller, etc.). Accordingly, one or more processes of certain EMS method embodiments may be implemented using the apparatuses shown and described in association with FIGS. 6-7 and controlled using hardware, software, firmware, or a combination thereof. Where the EMS method embodiments are controlled according to software or firmware, such software or firmware may be stored in a memory and be executed by a suitable instruction execution system. To the extent such EMS method embodiments are implemented under the control of hardware, such hardware implementations may be performed using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
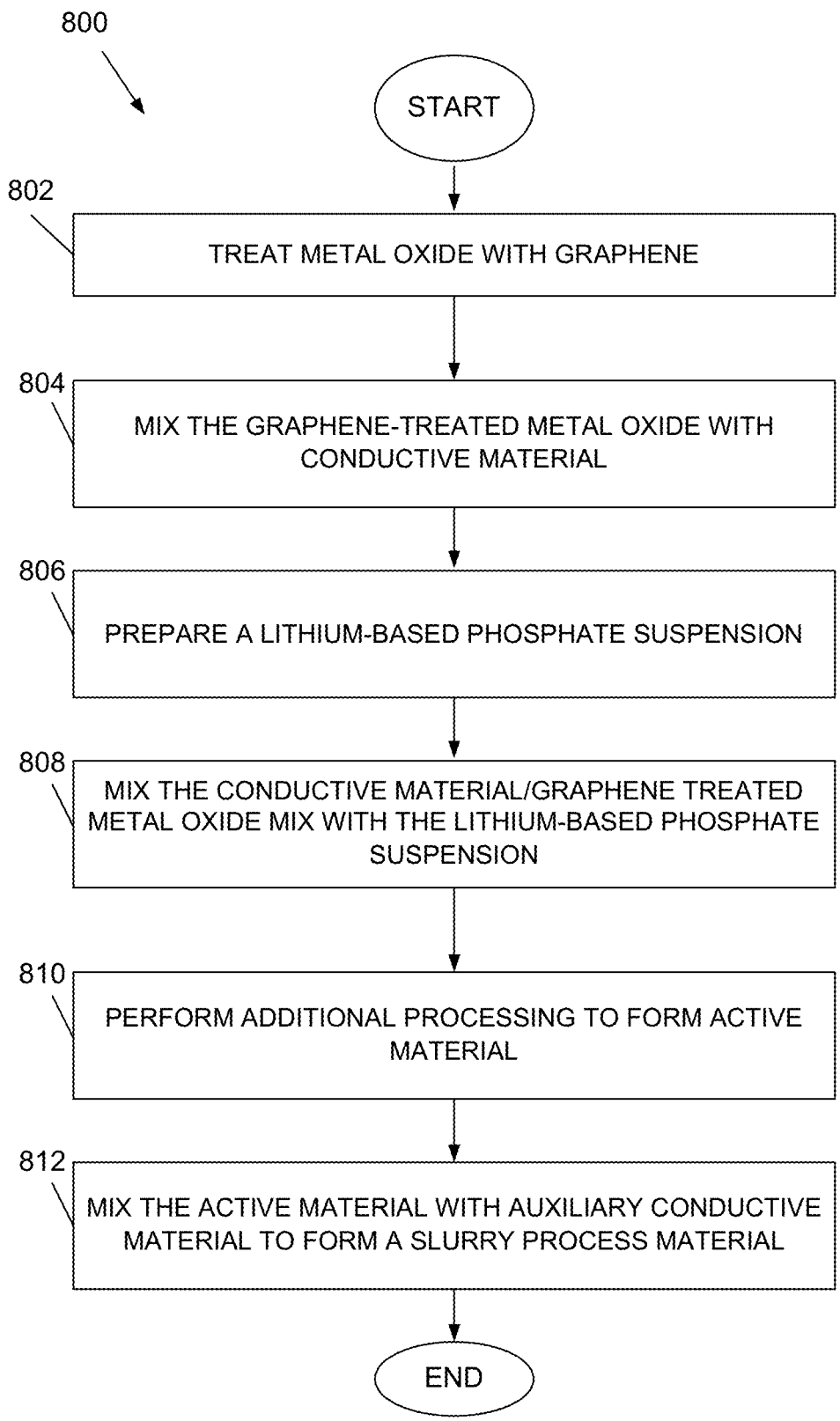
FIG. 8 is a flow diagram that depicts an embodiment of an example production process utilizing graphene-coated reactant that results in a low surface area for slurry process state material and final product.

Having described certain embodiments of EMS methods, it should be appreciated that one embodiment of an EMS method for forming an electrode for a lithium ion battery, referred to as method 800 and depicted in FIG. 8, comprises treating metal oxide (e.g., iron oxide) with graphene (802), mixing the graphene-treated metal oxide with conductive material (e.g., a first quantity of carbon black) (804), preparing a lithium-based phosphate suspension (806), mixing the conductive material/graphene treated metal oxide mix with the lithium-based phosphate suspension (808), and performing additional processing to form active material (810). As described above, the processing may include one or a combination of heating (e.g., including drying and heating), crushing, or grinding. The end result (after the processing) is the active material, also referred to as final product, which includes excellent electrochemical properties and a surface area of less than 10 $m^2/g$.

Continuing, the method 800 further comprises mixing the final product or active material with auxiliary conductive material to form a slurry process material (e.g., a second quantity of carbon black, although in some embodiments, a different type of conductive material may be used at this stage, using the same or different quantities as used in 804) (812). The result is the slurry process material having a surface area of less than 10 $m^2/g$, the slurry process material used to create an electrode for a lithium ion battery.

Figure 9:
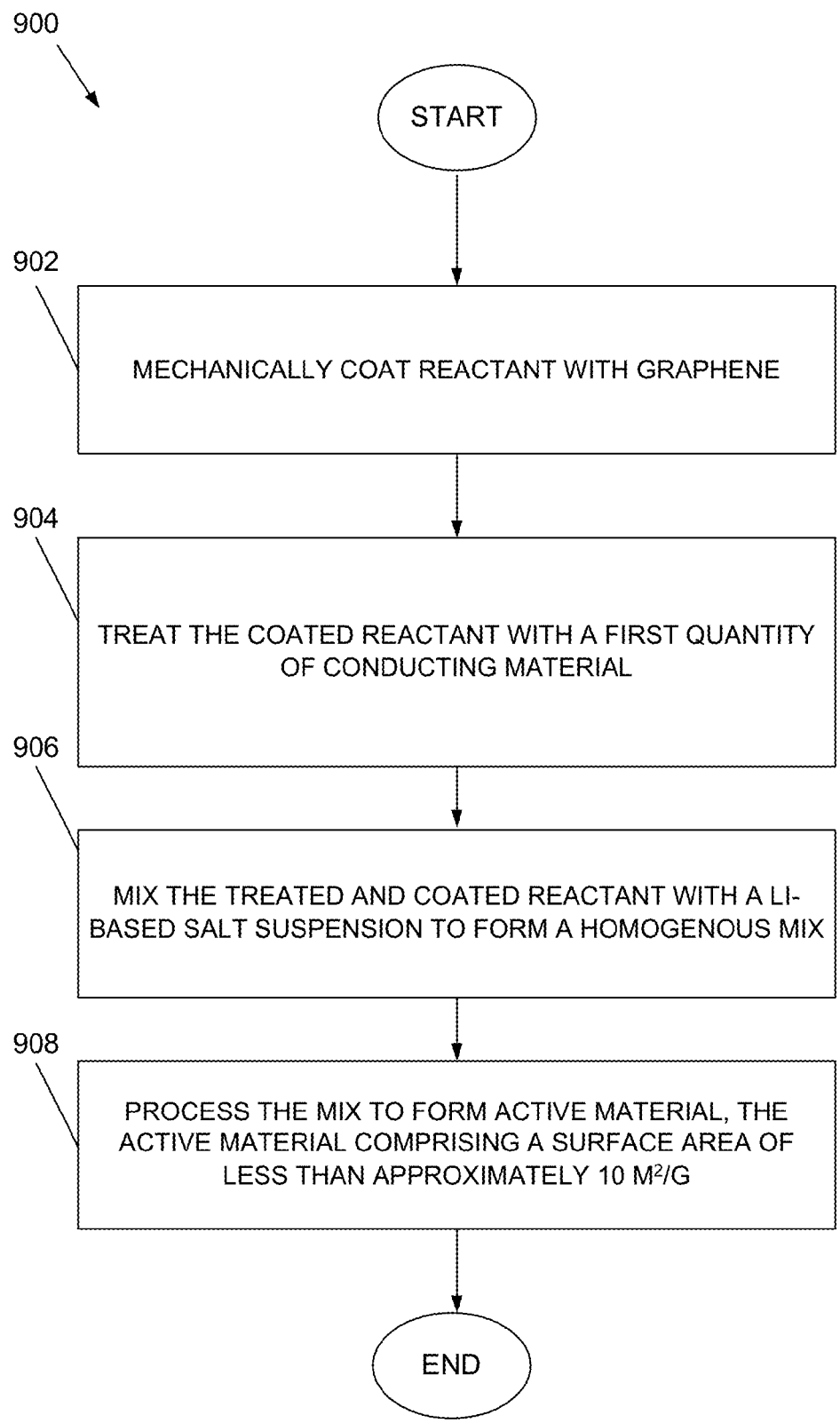
FIG. 9 is a flow diagram of an embodiment of a method for forming an electrode active material for a lithium ion battery.

Having described certain embodiments of EMS methods, it should be appreciated that another EMS method 900 for forming an electrode active material (e.g., cathode) for a lithium ion battery, depicted in FIG. 9, comprises mechanically coating reactant with graphene (902); treating the coated reactant with conducting material (904); mixing the treated and coated reactant with a Li-based salt suspension to form a homogenous mix (906); and processing the mix to form active material, the active material comprising a surface area of less than approximately 10 $m^2/g$ (908). As described above, processing may include one or more of heating, crushing, or grinding.

Note that steps may be omitted in some embodiments, and/or re-arranged in some embodiments. It should be appreciated that no particular order in processing is implied by the arrangement in method steps, and that some embodiments may have re-ordered method steps. Further, one or more of the above-mentioned method steps may be performed at least in part via an automated process, and is not limited to the apparatus or system embodiments described herein.

It should be emphasized that the above-described embodiments of the present disclosure, particularly, any "preferred" embodiments, are merely possible examples of implementations, merely set forth for a clear understanding of the principles of the EMS methods and associated compositions. Many variations and modifications may be made to the above-described embodiment(s) without departing substantially from the spirit and principles as disclosed. All such modifications and variations are intended to be included herein within the scope of this disclosure and protected by the following claims.

At least the following is claimed:

1. A method of forming an electrode for a lithium ion battery, the method comprising:
   mechanically coating reactant with graphene by enabling friction contact between the graphene and the reactant;
   treating the graphene-coated reactant with conducting material;
   mixing the treated and graphene-coated reactant with a Li-based salt suspension to form a homogenous mix; and
   processing the homogenous mix to form active material, the active material comprising a surface area of less than approximately 10 $m^2/g$.

2. The method of claim 1, further comprising adding auxiliary conductive material to the active material to obtain a slurry process state material, wherein the slurry process state material comprises a surface area of less than approximately 10 $m^2/g$, the slurry process state material used to form the electrode.

3. The method of claim 1, wherein the Li-based salt suspension is phosphate-based.

4. The method of claim 1, wherein treating the graphene-coated reactant with conducting material comprises providing approximately equimolar conducting material-to-reactant to the graphene-coated reactant.

5. The method of claim 1, wherein the conducting material comprises carbon black.

6. The method of claim 1, wherein the homogenous mix of the treated and graphene-coated reactant with the Li-based salt suspension comprises less than thirty weight percent of water content in weight.

7. The method of claim 1, wherein the homogenous mix of the treated and graphene-coated reactant with the Li-based salt suspension comprises approximately twenty weight percent of water content in weight.

8. The method of claim 1, wherein the homogenous mix of the treated and graphene-coated reactant with the Li-based salt suspension comprises approximately eighteen weight percent of water content in weight.

9. The method of claim 1, wherein mechanically coating the reactant with the graphene comprises chemically bonding at least partially the reactant and the graphene.

10. The method of claim 1, wherein processing comprises heating, crushing, or grinding, or one or more different combinations of the same.

11. The method of claim 10, wherein heating includes drying.

12. The method of claim 1, wherein the reactant comprises a metal oxide.

13. The method of claim 1, wherein the active material comprises a surface area of approximately 3.1 $m^2/g$ or approximately 6.7 $m^2/g$.

14. The method of claim 1, wherein the processed homogenous mix of the treated and graphene-coated reactant with the Li-based salt suspension comprises $LiMPO_4$ or its derivatives, where M comprises one or more first row transition metal elements.

15. The method of claim 1, wherein the processed homogenous mix of the treated and graphene-coated reactant with the Li-based salt suspension comprises non-stoichiometric $LiMPO_4$ or its derivatives in the non-stoichiometric form, where M comprises one or more first row transition metal elements.

* * * * *